(12) United States Patent
Coleiro

(10) Patent No.: US 12,474,007 B2
(45) Date of Patent: Nov. 18, 2025

(54) COUPLING DEVICE AND METHOD

(71) Applicant: L'Air Liquide, Societe Anonyme pour l'Etude et l'Exploitation des Procedes Georges Claude, Paris (FR)

(72) Inventor: Gaetan Coleiro, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 18/709,711

(22) PCT Filed: Oct. 7, 2022

(86) PCT No.: PCT/EP2022/077911
§ 371 (c)(1),
(2) Date: May 13, 2024

(87) PCT Pub. No.: WO2023/083533
PCT Pub. Date: May 19, 2023

(65) Prior Publication Data
US 2025/0003542 A1 Jan. 2, 2025

(30) Foreign Application Priority Data

Nov. 15, 2021 (FR) ...................... 2112047

(51) Int. Cl.
*F16L 37/34* (2006.01)
*F16L 55/10* (2006.01)
*F16L 59/18* (2006.01)

(52) U.S. Cl.
CPC .......... *F16L 55/1007* (2013.01); *F16L 37/34* (2013.01); *F16L 59/188* (2013.01); *Y10T 137/1654* (2015.04)

(58) Field of Classification Search
CPC ..... Y10T 137/1654; F16L 37/34; F16L 37/56; F16L 37/565; F16L 55/1007; F16L 59/153; F16L 59/182; F16L 59/187; F16L 59/188
See application file for complete search history.

(56) References Cited

U.S. PATENT DOCUMENTS 4,763,683 A * 8/1988 Carmack ................. F16L 37/32
141/285
4,998,560 A 3/1991 Le Devehat
(Continued)

FOREIGN PATENT DOCUMENTS

WO WO 88/03243 5/1988

OTHER PUBLICATIONS

International Search Report and Written Opinion for PCT/EP2022/077911, mailed Jan. 18, 2023.
French Search Report for FR 2 112 047, mailed May 17, 2022.

*Primary Examiner* — Hailey K. Do
(74) *Attorney, Agent, or Firm* — Justin K. Murray

(57) ABSTRACT

A coupling device and method for cryogenic fluid transport features quick connection, automatic closure, and emergency separation. The device includes two insulated pipes with self-closing valves at their connection ends. A quick-connection mechanism rapidly joins the pipes, while a distinct emergency separation system, located at one pipe's connection end, allows for immediate, safe disconnection in emergencies. This system ensures a rigid link during normal operation and a split configuration upon activation, separating the connection end from the pipe without fluid spillage. The design prioritizes reliable, sealed coupling/uncoupling and minimizes heat transfer, making it suitable for applications like liquid hydrogen.

14 Claims, 3 Drawing Sheets

(56) References Cited

U.S. PATENT DOCUMENTS

| | | | | |
|---|---|---|---|---|
| 5,297,574 | A | * | 3/1994 | Healy ................ B67D 7/3218 285/123.17 |
| 6,050,297 | A | * | 4/2000 | Ostrowski ............ F16L 37/367 137/614.04 |
| 9,490,491 | B2 | * | 11/2016 | Adams .............. H01M 8/04208 |
| 2015/0167882 | A1 | | 6/2015 | Von Keitz |
| 2020/0010314 | A1 | | 1/2020 | Kawai et al. |
| 2020/0182389 | A1 | * | 6/2020 | Frère .................... F16K 15/063 |

\* cited by examiner

[Fig. 1]
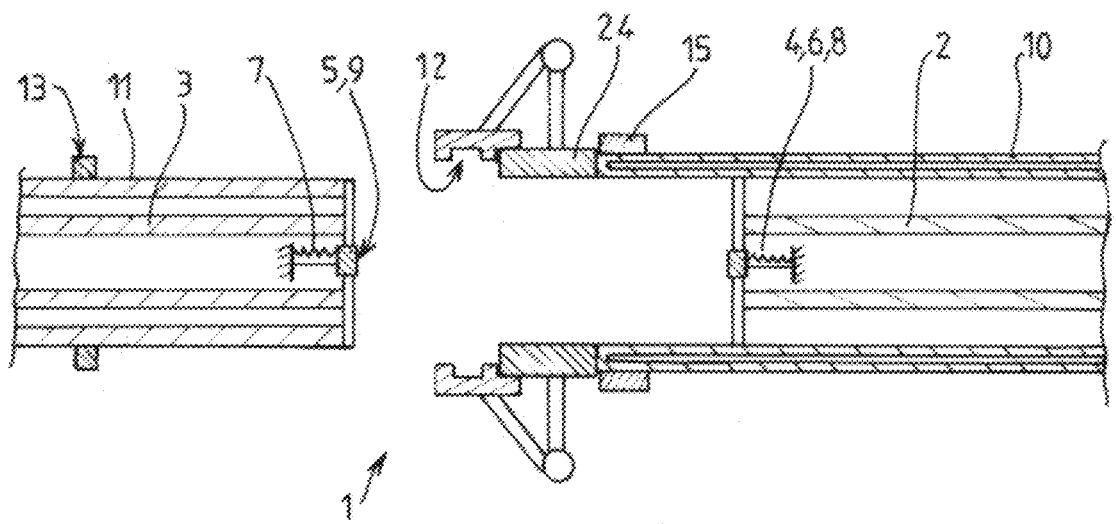
[Fig. 2]
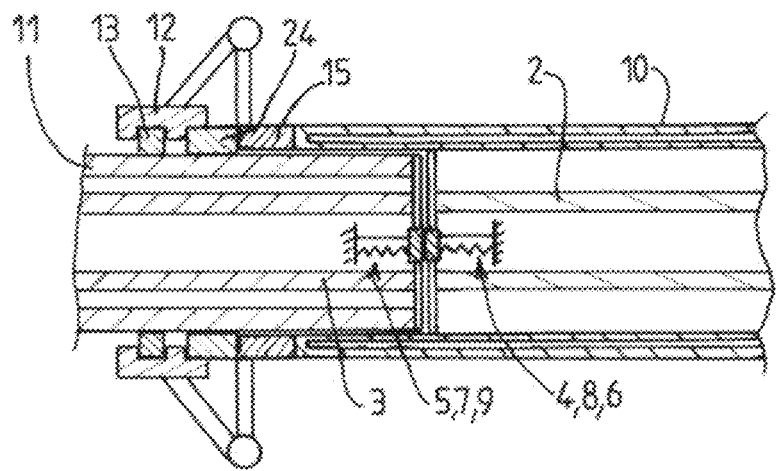

[Fig. 3]
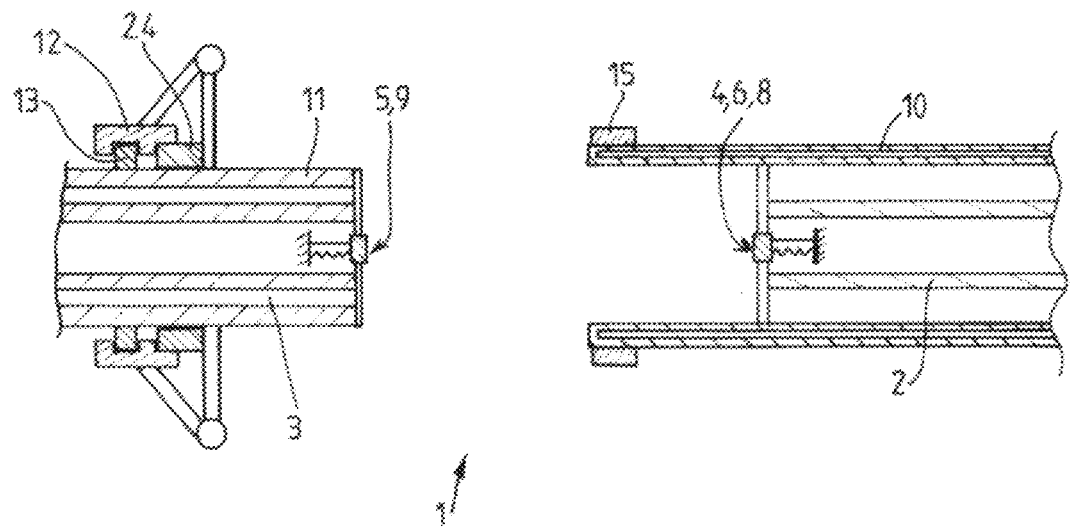
[Fig. 4]
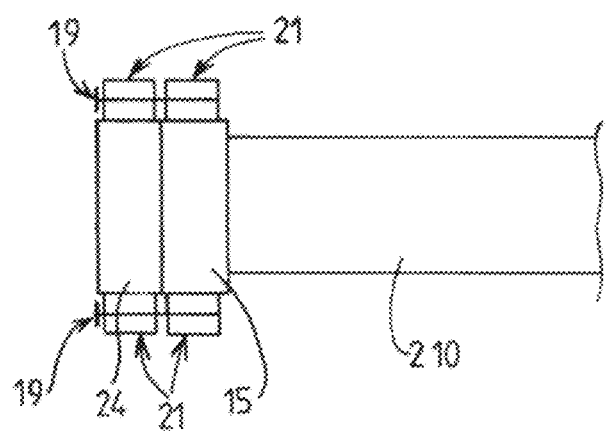
[Fig. 5]
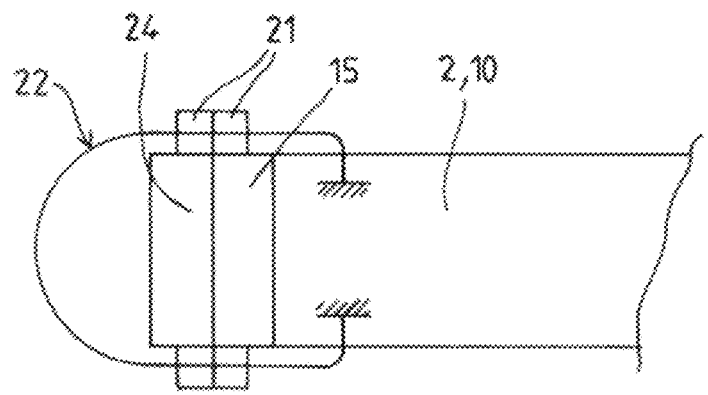

[Fig. 6]
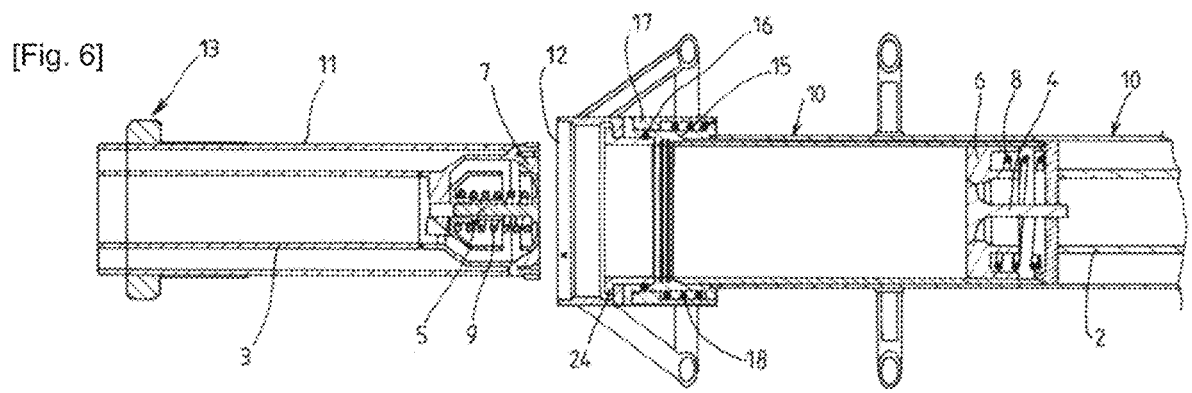
[Fig. 7]
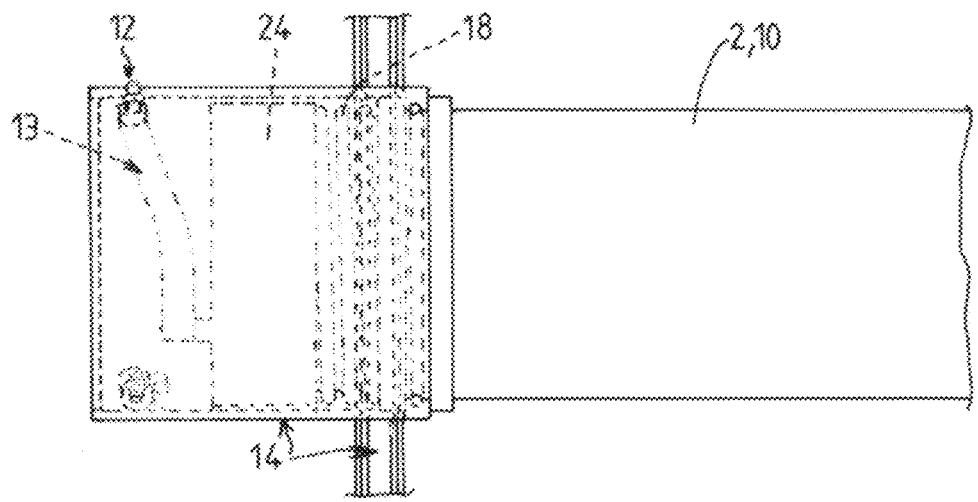
[Fig. 8]
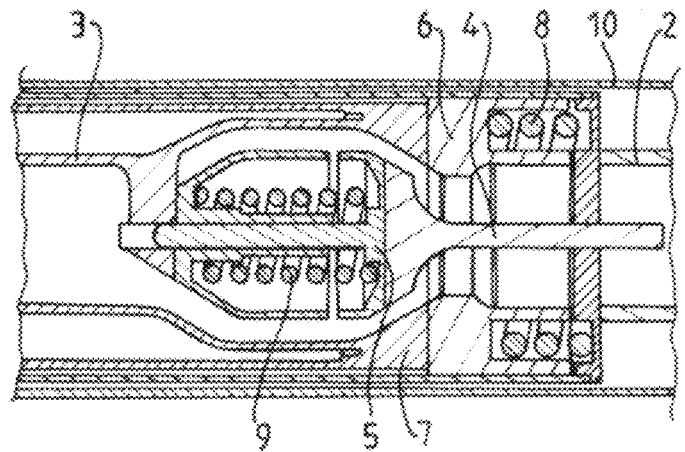

COUPLING DEVICE AND METHOD

CROSS REFERENCE TO RELATED APPLICATIONS

This application is a § 371 of International PCT Application PCT/EP2022/077911, filed Oct. 7, 2022, which claims the benefit of FR2112047, filed Nov. 15, 2021, both of which are herein incorporated by reference in their entireties.

FIELD OF THE INVENTION

The invention relates to a coupling device and method.

BACKGROUND OF THE INVENTION

The coupling devices for the transfer of cryogenic fluids (for example liquefied hydrogen) make use of a "Johnston" type fitting. The known devices require the line to be purged before and after coupling.

Other connection types exist for liquefied natural gas applications. However, the latter are not suitable for liquid hydrogen for reasons of thermal efficiency and safety. In particular, they do not offer the thermal insulation required.

One problem with coupling devices for the transfer of liquid hydrogen is the need to provide a quick and reliable connection that enables safe disconnection in the event of a problem.

One aim of the present invention is to overcome all or some of the disadvantages of the prior art that are set out above.

SUMMARY OF THE INVENTION

In certain embodiments, the invention relates more specifically to a coupling device for cryogenic fluid transport with emergency separation and automatic closure, the device comprising two fluid transport pipes extending in a longitudinal direction and each comprising, at a connection end, a valve mechanism configured to automatically close the pipe when the connection ends are separated and to enable the pipe to open when the connection ends are coupled, the device further comprising an outer tube that is arranged about each transport pipe and defines a space under vacuum for the thermal insulation of the transport pipe, the device comprising a quick-connection mechanism for the two pipes comprising mating mechanical attachment members located respectively at two connection ends, the device further comprising an emergency separation system designed to enable the separation of the two pipes when the connection ends are coupled using the quick-connection mechanism.

In an effort to overcome the deficiencies of the prior art discussed, supra, the device according to the invention, while corresponding to the generic definition given in the preamble above, can include an emergency separation system that is located at a connection end of a first pipe and comprises a set of linking parts movable between a first configuration ensuring a rigid mechanical link between the connection end provided with an attachment member or members for said first pipe and the rest of the first pipe and a second split configuration in which the connection end of the first pipe provided with a mechanical attachment member or members of the quick-connection mechanism is separated from the rest of the first pipe.

Furthermore, embodiments of the invention may have one or more of the following features:

- the quick-connection mechanism for the two pipes comprises at least one projecting part located on a connection end and at least one housing configured to house the projecting part or parts, for example the quick-connection mechanism is a bayonet and/or ball and/or claw and/or screw/nut connection,
- the connection end provided with the emergency separation system comprises a structure with two separable segments, the separation system comprising a mechanical link separably linking the two separable segments, for example a quick fitting with balls and/or separation-collar and/or breakable screws,
- the emergency separation system comprises a set of balls mounted at a joint between the two separable segments, the balls being mounted movably relative to the two segments between a first cooperating position butting against or clamping the two segments to provide a rigid link between the segments, and a second position in which the balls are neither butting against nor clamping one of the segments to enable separation of the segments, the emergency separation system comprising a locking ring that is movable between a locked position blocking the balls in their first position and an unlocked position enabling the balls to move toward their second position, the emergency separation system comprising a return member such as a spring urging the locking ring toward its locked position,
- the locking ring is mounted slidingly in the longitudinal direction on a segment rigidly connected to the outer tube of the pipe in question,
- the valve mechanism at each connection end comprises a valve and a seat, one of which is movable relative to the other and is urged toward a closed position by a return member,
- the valve mechanism of a first one of the transport pipes comprises a movable valve urged by a return member toward a closed position against a stationary seat arranged about the valve, the valve mechanism of the second transport pipe comprising a reference valve and a movable seat arranged about the reference valve, the movable seat being urged toward a closed position against the reference valve by a return member,
- the valve mechanism of one of the two transport pipes is housed inside its outer tube to a relatively more recessed extent than the other valve mechanism is in its tube, so as to form the male/female system in which, in the joined position of the two transport pipes, one connection end enters the other connection end,
- when transitioning from a separated position to the coupled position of the two connection ends, the valve mechanisms are configured to transition sequentially from a first configuration to a second configuration, in the first configuration the connection ends are in contact and the two valve mechanisms are closed, in the second configuration the connection ends are in contact and the valve mechanisms are opened by mutual actuation,
- the transition from the first configuration to the second configuration is performed by a relative movement of the two fluid transport pipes toward one another and/or by a relative movement of the two valve mechanisms toward one another, for example manually and/or under the control of a control member, the space under vacuum between the outer tube and the transport pipe comprises a thermal insulator, for example multi-layer insulation (MLI).

The invention also relates to a method for coupling two transport pipes of a device according to any one of the features above or below, comprising a step of moving the two connection ends toward one another, in which the two connection ends are coupled in a sealed manner with respect to the outside, a step of placing the two valve mechanisms (4, 6, 8, 5, 7, 9) in contact, a step of opening two valve mechanisms (4, 6, 8, 5, 7, 9), and a step of causing cryogenic fluid to flow from one pipe to the other.

According to other possible particular features, before the step of opening the two valve mechanisms, the method has an intermediate configuration in which the two connection ends are coupled in a sealed manner with respect to the outside and the two valve mechanisms are in the closed position, the step of opening the two valve mechanisms being performed via an additional relative movement of the two fluid transport pipes toward one another and/or a relative displacement of at least part of the two valve mechanisms.

The invention also relates to a method for separating two coupled transport pipes of a device according to any one of the features above or below, comprising a step of closing the two valve mechanisms via a relative movement of the two fluid transport pipes away from one another and/or a relative displacement of at least part of the two valve mechanisms, and then a step of separating the two connection ends.

According to a possible particular feature, between the step of closing the two valve mechanisms and the separation step, the method has an intermediate configuration in which the two connection ends remain coupled in a sealed manner with respect to the outside and the two valve mechanisms are in the closed position, the step of closing the two valve mechanisms being performed via an additional relative movement of the two fluid transport pipes away from one another and/or a relative displacement of at least part of the two valve mechanisms.

The invention may also relate to any alternative device or method comprising any combination of the features above or below within the scope of the claims.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

Other features and advantages are set out in the description below, provided with reference to the figures in which:

FIG. 1 shows a schematic and partial view in longitudinal section, illustrating a first exemplary embodiment of the coupling device in an uncoupled configuration, FIG. 2 shows a schematic and partial view in longitudinal section, illustrating the first exemplary embodiment of the coupling device in a coupled configuration, FIG. 3 shows a schematic and partial view in longitudinal section, illustrating the first exemplary embodiment of the coupling device in a separated configuration resulting from the emergency separation system, FIG. 4 shows a schematic and partial side view of a detail of the coupling device illustrating another exemplary embodiment of the emergency separation system, FIG. 5 shows a schematic and partial side view of a detail of the coupling device illustrating another further exemplary embodiment of the emergency separation system, FIG. 6 shows a schematic and partial view in longitudinal section, illustrating a second exemplary embodiment of the coupling device in an uncoupled configuration, FIG. 7 shows a schematic, partial, transparent side view of a detail of a second exemplary embodiment of the coupling device in a coupled position, FIG. 8 shows a view in longitudinal section of another exemplary embodiment of the valve mechanisms of the coupling device in an open position.

DETAILED DESCRIPTION OF THE INVENTION

The illustrated coupling device 1 is configured for the transport of cryogenic fluid, for example liquid hydrogen. This device has quick coupling, emergency separation and automatic closure.

The device 1 comprises two fluid transport pipes 2, 3 extending in a longitudinal direction and each comprising, at a connection end, a valve mechanism 4, 6, 8, 5, 7, 9 configured to automatically close the pipe 2, 3 when the connection ends are separated. The valve mechanisms are configured to enable the pipe 2, 3 to open and fluid to flow when the connection ends are coupled.

The device 1 also comprises an outer tube 10, 11 arranged about each transport pipe 2, 3 and defining a space under vacuum to thermally insulate the transport pipe 2, 3. The space under vacuum between the outer tube 10, 11 and the transport pipe 2, 3 may comprise a thermal insulator, for example multi-layer insulation (MLI).

The connection ends preferably form a male/female system in which a male end 3, 11 is housed in the female end 2, 10 when the connection ends are coupled.

Thus, the valve mechanism 4, 6, 8 of one of the two transport pipes 2 may be housed inside its outer tube 10 to a relatively more recessed extent than the other valve mechanism 5, 7, 9 is in its tube 11, so as to form the male/female system in which, in the joined position of the two transport pipes 2, 3, one connection end enters the other connection end.

The device 1 comprises a quick-connection mechanism for the two pipes 2, 3 comprising mating mechanical attachment members 12, 13 located respectively at the two connection ends.

The quick-connection mechanism of the two pipes 2, 3 preferably comprises at least one projecting part 12 located on one connection end and at least one housing 13 configured to receive the projecting part or parts. For example, the quick-connection mechanism is a bayonet connection (see [FIG. 7]: at least one pin 12 is received in a slot 13). Naturally, the quick-connection mechanism may be any other suitable type, for example with a ball and/or claw and/or screw/nut connection (quick connection notably used in the hydraulic pipes in fire fighting equipment).

The device 1 further comprises an emergency separation system (also known as a "breakaway") configured to enable the two pipes 2, 3 to be separated when the connection ends are coupled using the quick-connection mechanism 12, 13.

The emergency separation system is located at a connection end of a first pipe and comprises a set of linking parts movable between a first configuration ensuring a rigid mechanical link between the connection end provided with an attachment member or members 12, 13 for said first pipe 2, 3 and the rest of the first pipe 2, 3 (see for example [FIG.

1] or [FIG. 2]) and a second split or separated configuration in which the connection end of the first pipe provided with a mechanical attachment member or members 12, 13 of the quick-connection mechanism is separated from the rest of the first pipe 2, 3 (see [FIG. 3]). This means that the emergency separation system is distinct from the quick-connection system. These two systems and mechanisms ensure distinct separations of the two pipes.

For example, the connection end provided with the emergency separation system comprises a structure with two separable segments 24, 15, the separation system comprising a mechanical link separably linking the two separable segments 24, 15. For example, this mechanical link is a ball link (see [FIG. 6], as described in more detail below).

Naturally, the separable mechanical link may include any other mechanism, for example a collar 22 linking two flanges 21 belonging to the two separable adjacent segments. Similarly, the mechanical link may include a system of breakable screws 19 providing a link between two flanges 21 belonging to two separable adjacent segments [see FIG. 4].

In the event of application of a force above a threshold and/or in the event of activation, the mechanical link 19, 22 is broken, enabling separation of the two segments 24, 15.

In the example in [FIG. 6], the emergency separation system comprises a set of balls 16 mounted at a joint between the two separable segments 24, 15.

The balls 16 are for example mounted radially movably relative to the two segments 24, 15 between a first cooperating position butting against or clamping the two segments 24, 15 to provide a rigid longitudinal link between the segments 24, 15 and a second position in which the balls 16 are neither butting against nor clamping one 24 of the segments, thereby enabling separation of the segments 24, 15.

As illustrated, the emergency separation system preferably further comprises a locking ring 17 movable between a locked position blocking the balls 16 in their first position and an unlocked position enabling the balls 16 to move toward their second position (see [FIG. 6]). The emergency separation system comprises a return member 18 such as a spring urging the locking ring 17 toward its locked position. Thus, in normal configuration, the locking ring 17 blocks and prevents separation of the two segments 24, 15. Conversely, the movement of the locking ring 17 enables this mechanical ball link to be unlocked, thereby enabling the two segments to be separated.

The locking ring 17 may be mounted slidingly in the longitudinal direction on a segment 15 rigidly connected to the outer tube 10 of the pipe 2 in question.

The valve mechanism at each connection end 5, 7, 9, 4, 6, 8 may be a movable valve urged toward a seat by a return member such as a spring.

Furthermore and preferably, during transition from a separated position ([FIG. 1]) to the coupled position ([FIG. 2]) of the two connection ends, the valve mechanisms 4, 6, 8, 5, 7, 9 are preferably configured to transition sequentially from a first configuration to a second configuration. In the first configuration, the connection ends may be in contact and the valve mechanisms are not opened.

As shown in the example in [FIG. 6] and [FIG. 8], a first of the transport pipes 3 may comprise a movable valve 5 urged by a return member 9 toward a closed position against a stationary seat 7 arranged about the valve 5. The valve mechanism of the second transport pipe 2 may for its part comprise a reference valve 4 and a movable seat 6 arranged about the reference valve 4, the movable seat 6 being urged toward a closed position against the reference valve 4 by a return member 8.

For example, the reference valve 4 of the second transport pipe 2 is stationary and not movable in relation to its transport pipe 2, and in the second configuration one end of the reference valve 4 of the second transport pipe 2 automatically pushes the movable valve 5 of the first transport pipe 3 out of its seat 7 to open same and provide fluidic communication between the two transport pipes 2, 3.

For example, in the embodiment in [FIG. 6] and [FIG. 8], the reference valve 4 of the second transport pipe 2 does not push the movable valve 5 of the first transport pipe 3 out of its seat 7, leaving the valve mechanism closed. The movable seat 6 remains in its closed position against the reference valve 4. Conversely, in the second configuration, the valve mechanisms are opened (for example mutual actuation of the valve mechanisms).

For example, in the embodiment in [FIG. 6] and [FIG. 8], in the second configuration, the connection ends are in contact and the reference valve 4 of the second transport pipe 2 pushes the movable valve 5 of the first transport pipe 3 out of its seat 7 and causes the valve mechanism to open.

For example, in the first configuration, the connection end of the first transport pipe 3 does not push the movable seat 6 of the second transport pipe 2 relative to its reference valve 4, thereby keeping same closed and preventing fluidic communication between the two transport pipes 2, 3. Furthermore, in the second configuration, the connection end of the first transport pipe 3 pushes the movable seat 6 of the second transport pipe 2 relative to its reference valve 4 to open same and provide fluidic communication between the two transport pipes 2, 3.

In the coupled position of the two transport pipes 2, 3, the connection end of the first transport pipe 3 may optionally automatically butt against and push the movable seat 6 of the second transport pipe 2 relative to its reference valve 4 to open same and provide fluidic communication between the two transport pipes 2, 3.

The transition from the first configuration (valve mechanisms closed) to the second configuration (valve mechanisms open) may be performed by a relative movement of the two fluid transport pipes 2, 3 toward one another and/or by a relative movement of the two valve mechanisms 4, 6, 8, 5, 7, 9 toward one another, for example manually and/or under the control of a control member.

A sequence for coupling two transport pipes 2, 3 of such a device may comprise a step of moving the two connection ends toward one another, in which the two connection ends are coupled in a sealed manner with respect to the outside, then a step of placing the two valve mechanisms 4, 6, 8, 5, 7, 9 in contact, a step of opening two valve mechanisms 4, 6, 8, 5, 7, 9, and a step of causing cryogenic fluid to flow from one pipe to the other.

The sequence may include, before the step of opening the two valve mechanisms 4, 6, 8, 5, 7, 9, an intermediate stable configuration in which the two connection ends are coupled in a sealed manner with respect to the outside and the two valve mechanisms 4, 6, 8, 5, 7, 9 are in the closed position, the step of opening the two valve mechanisms 4, 6, 8, 5, 7, 9 being performed via an additional relative movement of the two fluid transport pipes 2, 3 toward one another and/or a relative displacement of at least part of the two valve mechanisms.

The two valve mechanisms 4, 6, 8, 5, 7, 9 may be closed by a relative movement of the two fluid transport pipes 2, 3 away from one another and/or a relative displacement of at least part of the two valve mechanisms. This closure may be followed by a step of separating the two connection ends.

Between the step of closing the two valve mechanisms 4, 6, 8, 5, 7, 9 and the separation step, the device may also pass through a stable intermediate configuration in which the two connection ends remain coupled in a sealed manner with respect to the outside and the two valve mechanisms 4, 6, 8, 5, 7, 9 are in the closed position. The step of closing the two valve mechanisms 4, 6, 8, 5, 7, 9 may be performed via an additional relative movement of the two fluid transport pipes 2, 3 away from one another and/or a relative displacement of at least part of the two valve mechanisms.

The device 1 has a simple and ergonomic structure and enables reliable connection and disconnection, for example manually.

The device minimizes heat entering the cold parts. Furthermore, the external parts are at cryogenic temperature. The device does not require purging before and after fluid transfer.

The sealed coupling/uncoupling and the opening/closing of the valve mechanisms may be performed sequentially.

The two ends simultaneously have a quick-connection mechanism and an emergency separation system that does not spill fluid in the event of separation. This means that a single device combines a quick connection and a separation system.

The quick-connection mechanism may remain active, but an operator can separate the two connection ends using the separation mechanism in the event of an incident.

Furthermore and preferably, the separation permitted by the separation system is performed on the relatively hotter connection end. This helps to protect the relatively colder cold end and ensures that the operator is not exposed thereto.

It should be noted that the quick-connection mechanism may be of the same type as the separation system, where applicable.

As illustrated, a gripping member 14 may be provided to handle a connection end, notably on the quick-connection mechanism thereof. This gripping member 14 may remain connected to the other connection end following separation by the separation system.

Another gripping member 23, for example of the same type, may be provided elsewhere on this connection end (and/or on the other connection end).

The solution detailed above is inexpensive, low mass, and small in size.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A coupling device for cryogenic fluid transport with emergency separation and automatic closure, the coupling device comprising:
   two fluid transport pipes extending in a longitudinal direction and each of the two fluid transport pipes comprising, at a respective connection end, a valve mechanism configured to automatically close the respective fluid transport pipe when the two connection ends are separated and to enable the respective fluid transport pipe to open when the two connection ends are coupled;
   an outer tube arranged about each of the two fluid transport pipes and defining a space under vacuum to thermally insulate the respective fluid transport pipe;
   a quick-connection mechanism for the two fluid transport pipes comprising mating mechanical attachment members located respectively at the two connection ends; and
   an emergency separation system configured to enable the two fluid transport pipes to be separated when the two connection ends are coupled using the quick-connection mechanism,
   wherein the emergency separation system is located at a connection end of a first pipe and comprises a set of linking parts movable between a first configuration ensuring a rigid mechanical link between the connection end provided with an attachment member or members for said first pipe and the rest of the first pipe and a second split configuration in which the connection end of the first pipe provided with a mechanical attachment member or members of the quick-connection mechanism is separated from the rest of the first pipe,
   wherein the connection end provided with the emergency separation system comprises a structure with two separable segments, the emergency separation system comprising a mechanical link separably linking the two separable segments,
   wherein the emergency separation system comprises a set of balls mounted at a joint between the two separable segments, the set of balls being mounted movably relative to the two separable segments between a first cooperating position butting against or clamping the two separable segments to provide a rigid link between the two separable segments, and a second position in which the set of balls are neither butting against nor clamping one of the two separable segments to enable separation of the two separable segments, the emergency separation system comprising a locking ring that is movable between a locked position blocking the set of balls in their first position and an unlocked position enabling the set of balls to move toward their second position, the emergency separation system comprising a return member urging the locking ring toward its locked position.

2. The coupling device as claimed in claim 1, wherein the locking ring is mounted slidingly in the longitudinal direction on a segment rigidly connected to the outer tube of the respective fluid transport pipe of the two fluid transfer pipes.

3. The coupling device as claimed in claim 1, wherein the valve mechanism at each connection end comprises a valve and a seat, one of which is movable relative to the other and is urged toward a closed position by a return member.

4. The coupling device as claimed in claim 1, wherein the space under vacuum between the outer tube and the respective fluid transport pipe comprises a thermal insulator.

5. The coupling device as claimed in claim 1, wherein the quick-connection mechanism for the two fluid transport pipes comprises at least one projecting part located on the respective connection end and at least one housing configured to house the at least one projecting part or parts.

6. The coupling device as claimed in claim 5, wherein the quick-connection mechanism is selected from a group consisting of a bayonet, a ball, a claw, a screw/nut connection, and combinations thereof.

7. A method for coupling two cryogenic fluid transport pipes by means of the coupling device as claimed in claim 1, comprising a step of moving the two connection ends toward one another, in which the two connection ends are coupled in a sealed manner with respect to an outside, a step of placing the two valve mechanisms in contact, a step of opening two valve mechanisms, and a step of causing cryogenic fluid to flow from one of the two cryogenic fluid transport pipes to the other of the two cryogenic fluid transport pipes.

8. The method as claimed in claim 7, wherein, before the step of opening the two valve mechanisms, said method has an intermediate configuration in which the two connection ends are coupled in a sealed manner with respect to the outside and the two valve mechanisms are in the closed position, the step of opening the two valve mechanisms being performed via an additional relative movement of the two fluid transport pipes toward one another and/or a relative displacement of at least part of the two valve mechanisms.

9. A method for separating two cryogenic fluid transport pipes coupled by means of the coupling device as claimed in claim 1, including a step of closing the two valve mechanisms via a relative movement of the two fluid transport pipes away from one another and/or a relative displacement of at least part of the two valve mechanisms, and then a step of separating the two connection ends.

10. The separation method as claimed in claim 9, wherein, between the step of closing the two valve mechanisms and the separation step, said method has an intermediate configuration in which the two connection ends remain coupled in a sealed manner with respect to an outside and the two valve mechanisms are in the closed position, the step of closing the two valve mechanisms being performed via an additional relative movement of the two fluid transport pipes away from one another and/or a relative displacement of at least part of the two valve mechanisms.

11. A coupling device for cryogenic fluid transport with emergency separation and automatic closure, the coupling device comprising:
two fluid din in a longitudinal direction and each of the two fluid transport pipes comprising, at a connection end, a valve mechanism configured automatically close the respective fluid when the two connection ends are separated and to enable the respective fluid transfer pipe to open when the two connection ends are coupled;
an outer tube arranged about each of the two fluid transport pipes and defining a space under vacuum to thermally insulate the respective fluid transport pipe;
a quick-connection mechanism for the two pipes comprising mating mechanical attachment members located respectively at the two connection ends; and
an emergency separation system configured to enable the two fluid transport pipes to be separated when the two connection ends are coupled using the quick-connection mechanism,
wherein the emergency separation system is located at a connection end of a first pipe and comprises a set of linking parts movable between a first configuration ensuring a rigid mechanical link between the connection end provided with an attachment member or members for said first pipe and the rest of the first pipe and a second split configuration in which the connection end of the first pipe provided with a mechanical attachment member or members of the quick-connection mechanism is separated from the rest of the first pipe,
wherein the valve mechanism of a first of the two fluid transport pipes comprises a movable valve urged by a return member toward a closed position against a stationary seat arranged about the movable valve, the valve mechanism of a second of the two fluid transport pipes comprising a reference valve and a movable seat arranged about the reference valve, the movable seat being urged toward a closed position against the reference valve by a return member.

12. The coupling device as claimed in claim 11, wherein the valve mechanism of one of the two fluid transport pipes is housed inside its outer tube to a relatively more recessed extent than the other valve mechanism is in its tube, so as to form a male/female system in which, in a joined position of the two fluid transport pipes, one connection end enters the other connection end.

13. The coupling device as claimed in claim 11, wherein when transitioning from a separated position to the coupled position of the two connection ends, the two valve mechanisms are configured to transition sequentially from a first configuration to a second configuration, in the first configuration the two connection ends are in contact and the two valve mechanisms are closed, in the second configuration the two connection ends are in contact and the two valve mechanisms are opened by mutual actuation.

14. The coupling device as claimed in claim 13, wherein a transition from the first configuration to the second configuration is performed by a relative movement of the two fluid transport pipes toward one another and/or by a relative movement of the two valve mechanisms toward one another.

* * * * *